United States Patent Office 3,813,282
Patented May 28, 1974

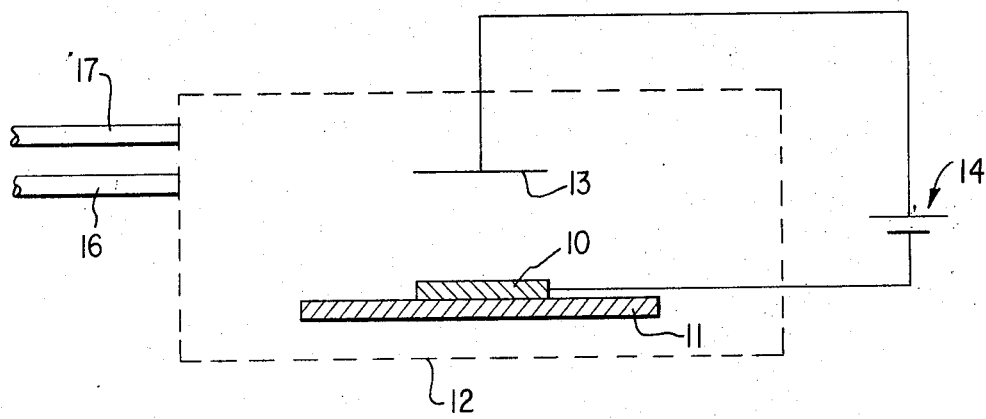

3,813,282
LAMINATING PROCESS INCLUDING CATHODE
SPUTTERING OF CARBON SUBSTRATE
Robert Masotti, Lyon, Jean-Philippe Rieux, Decines,
Philippe Borrel, St. Martin le Vinoux, and Jean
Lehureau, Lyon, France, assignors to Progil, Paris,
France
Filed Dec. 29, 1971, Ser. No. 213,851
Claims priority, application France, Dec. 31, 1970,
7047731
Int. Cl. B32b 3/00, 5/02
U.S. Cl. 161—164
6 Claims

ABSTRACT OF THE DISCLOSURE

A carbon substrate is subjected to superficial cathode sputtering to alter its surface characteristics. Carbon substrates thus treated are useful for the fabrication of various composite assemblies exhibiting improved physical properties, such as enhanced mechanical strength.

BACKGROUND OF THE INVENTION

The present invention relates to subjecting a carbon [1] substrate, for example, carbon fibers, filaments, fibrils, films, ribbons, sheets, plates, and the like, to a superficial cathode sputtering treatment induced by the ionic bombardment of its surface. The carbon substrate thus treated exhibits considerably altered or modified surface characteristics.

This invention also relates to composite articles comprised of a carbon substrate which has been subjected to the aforesaid superficial cathode sputtering treatment, and which composite articles exhibit various improved physical properties such as enhanced mechanical strength. By the term "composite article" there is intended any heterogeneous assembly comprised of two or more components, at least one of which defines a continuous phase comprising the said assembly, hereinafter designated as a "matrix" component, and at least one other component defining reinforcing means or reinforcement for the said composite assembly. For example, the respective components of the composite assemblies of the invention can either be coated, layered, stratified and/or laminated, and the like, and the matrix of which can be a heat-curable resin and the reinforcing means or reinforcement can be fibrous, felt, or fabric in nature, and of diverse origin, e.g., glass, carbon, synthetic fabric and the like. Exemplary of other composites or composite assemblies, there are mentioned metal-carbon, metal-fiber, and the like. Also representative of such composites are those fabricated utilizing an adhesive and in which the adhesive defines the continuous phase or serves as the matrix therefor.

By way of background, in the prior art composites or composite assemblies it is known that the reinforcing means or reinforcement enhances such properties as tensile strength and/or bending strength, but that these properties nevertheless evidence values considerably lower than the theoretical which is calculated on the basis of the actual strength of the reinforcing means and its ratio among the materials comprising the composite. This loss in such properties is moreover known to be especially due to the lack of adhesion between the matrix component and the reinforcing means comprising the composite. If, on the one hand, the inherent properties of the matrix, and on the other those of the reinforcement, play a considerable role in the transfer of force from one component to the other, the degree of interaction between such two components is also determinative. In an effort to improve upon the aforesaid degree of interaction, the prior art is replete with attempts to modify the physical properties of various composites by performing a variety of surface treatments upon the reinforcement or reinforcing means comprising the same, and which include various chemical, electrochemical, mechanical, and other treatments. Unfortunately, the results which have been attained to date can be deemed to be generally inadequate, otherwise deficient, and/or are not readily reproducible. A need therefore exists for improving the physical properties of composites to align these properties more closely to the theoretical.

SUMMARY OF THE INVENTION

Accordingly, a primary object of this invention is to provide an improved surface treatment for reinforcing means intended for ultimate use in otherwise conventional composite assemblies.

Another object of this invention is to provide an improved composite assembly, the physical properties of which more closely conform to the theoretical.

Still another object of the invention is to provide a carbon substrate having enhanced surface characteristics such that it is eminently suitable for the fabrication of composites therefrom by reason of its great compatibility with the great adhesiveness to various matrix components therefor.

In attaining these objects, one feature of this invention resides in subjecting a carbon substrate, for example, carbon fibers, filaments, fibrils, films, ribbons, sheets, plates, and the like, to a superficial cathode sputtering treatment induced by the ionic bombardment of the surface thereof. The carbon substrate thus treated exhibits enhanced surface characteristics. Another feature of this invention resides in the fabrication of various composite assemblies utilizing the thus treated carbon substrate as the reinforcing means therefor and which composites exhibit properties of tensile and/or bending strength, etc., which more closely conform to the theoretical.

Other objects, features, and advantages of the invention will be apparent to those skilled in the art from the detailed description of the invention which follows.

BRIEF DESCRIPTION OF THE DRAWING

The figure schematically illustrates apparatus used in the cathode sputtering of the present invention.

DETAILED DESCRIPTION OF THE INVENTION

Cathode or cathodic sputtering is a very well known technique, being based upon the equally well known phenomenon of the low puressure ionization of gas via a strong electric field produced by the application of continuous voltage between two electrodes; it is the result of the disintegration of the metal or other cathode in a vacuum tube due to bombardment by positive ions.

That zone of voltage-current strength which exhibits characteristics favorable to the phenomenon of cathode or cathodic sputtering is the zone which permits of "an abnormal luminescent discharge" and which is characterized by high ionic density and energy and a variation in current strength with voltage. Ions are highly accelerated by the cathodic voltage and bombard the cathodic target thus ejecting superficial or surface atoms therefrom, leaving the cathode surface in an abraded and roughened condition, and secondary electron emission permits of the maintenance of the discharge.

According to the invention, and referring to the Figure, the material to be subjected to treatment, i.e., the carbon substrate 10 (on non-conductor 11), is first connected to a high voltage input 14 and assumes the position of cathode or cathodic target in a typical cathode sputtering organization (the anode being designated 13). Next, the various elements are placed in a suitable vacuum chamber ---
[1] The term "carbon" is intended to include both the non-graphitic and graphite forms of carbon.

12, which is then degassified using vacuum tube 16 under a high vacuum of about $10^{-6}$ torr. Finally, a residual low pressure atmosphere is established through gas outlet 17, said atmosphere comprising any one or more of the known discharge gases suitable for such purposes. Generally, the aforesaid low pressure ranges from between about $10^{-3}$ to $10^{-1}$ torr. The high voltage, which advantageously ranges from between about 500 to 10,000 volts, is then impressed upon the carbon substrate 10 which defines the cathode or cathodic target. The power requirement which gives rise to the ionic bombardment and initiates the phenomenon of cathode sputtering depends both on the voltage applied and upon the ionic current, which latter directly depends on the gas discharge pressure. The success of the treatment depends both on the power applied and the duration of application. During the treatment which is advantageously effected in an inert gas, for example, argon, the surface of the carbon substrate or cathodic target is completely modified, same being subjected to a true ionic sanding or abrading with a consequence of immediate removal of the superficial layers of the said carbon substrate. These superficial or surface layers are charged with various impurities such as fat, hydrocarbons, chemisorbed material and various other impurities, either in elemental state or in combined form (for example, oxygen, nitrogen, hydrogen, and the like), and which impurities are inherent in the various processes of carbon elaboration. The aforesaid ionic sanding or abrading is effective even in the smallest pores or voids at the cathode surface due to the high energy of the projectile ions. And in the presence of an inert gas, the state of pure carbon is very nearly attained.

Exemplary of the various discharge gases that can be employed, there are mentioned the rare gases such as argon, krypton, ann the like, and the reactive gases such as oxygen, nitrogen, steam, and the like, or a mixture of these gases.

In order to further illustrate the present invention and the advantages thereof, the following specific examples are given, it being understood that the same are intended merely as illustrative and in no wise limitative.

EXAMPLE 1

A small plate of glassy[2] carbon was connected to assume the position of cathode target in a conventional cathodic sputtering apparatus. Upon degassification under a vacuum of $10^{-6}$ torr, a stream of pure argon was slowly introduced into the vacuum chamber via a valved conduit until a pressure of $35.10^{-3}$ torr was attained. A high continuous voltage of 3 kv. was then applied to the cathodic target for about 15 minutes with the result of superficial disintegration of the said glassy carbon substrate due to bombardment by positive ions. In a second step of the process, the pure argon was replaced by a gaseous mixture of argon and steam, with the percentage of residual pressure of the steam in the mixture being about 0.5 percent. A residual atmosphere of this mixture was then introduced into the apparatus exactly as in and under the conditions of the first step in the treatment. The ionic bombardment was conducted for a period of about 90 seconds.

EXAMPLE 2

In this example the procedures, conditions and parameters of Example 1 were dpulicated, exactly as therein set forth for the first step of the process, except that in the second step thereof a gaseous mixture of argon and oxygen was introduced, the partial pressure of the oxygen being about 20 percent. The ionic bombardment was conducted for a period of about 30 seconds.

[2] The term "glassy carbon" is intended to be a carbon obtained by carbonization and subsequent thermal treatment of carbonaceous materials with strong transversal molecular bounds, particularly phenolic resins.

EXAMPLE 3

In this example the procedures, conditions and parameters of Example 1 were again duplicated, exactly as therein set forth, except that this experiment was conducted in but a single step (corresponding to the step 1 of Example 1) in a residual atmosphere of pure argon under a pressure of $35.10^{-3}$ torr. The high continuous voltage was maintained at 3 kv., and the ionic bombardment was conducted for a period of about three minutes.

EXAMPLE 4

In this example the procedures, conditions and parameters of Example 3 were duplicated, exactly as therein set forth, except that the atmosphere of pure argon was replaced with an atmosphere of pure oxygen. The ionic bombardment was conducted for a period of about three minutes.

EXAMPLE 5

In this example the procedures, conditions and parameters of Example 3 were again duplicated, exactly as therein set forth, except that the ionic bombardment was conducted for a period of about six minutes.

EXAMPLE 6

In this example the procedures, conditions and parameters of Example 4 were duplicated, exactly as therein set forth, except that the ionic bambardment was conducted for a period of about six minutes.

EXAMPLE 7

In this example the procedures, conditions and parameters of Example 3 were again duplicated, exactly as therein set forth, except that the atmosphere of pure argon was under a pressure of $50 \cdot 10^{-3}$ torr, the high continuous voltage being maintained at 3 kv. The ionic bombardment was conducted for a period of about 30 seconds.

The surface characteristics of the plates of glassy carbon of the foregoing Examples 1 to 7 were all modified as a consequence of the respective treatment to which each was subjected. In order to determine the influence of the respective treatments upon each plate, insofar as surface characteristic modification is concerned, seven composites were fabricated by coating the plate of each example with a thin layer of bisphenol A diepoxide cured with diethylenetriamine. This polyadditive system was cured for 16 hours at room temperature, and then for 2 hours at 80° C. The tensile strength of the adhesive bonds between the carbon and resin layers of the respective composites was next measured. For purposes of this measurement, the composites were placed between the flat faces of steel cylinders, each of which exerting a tractive force perpendicular to the assembly. Cohesion in the face of the drawing operation was measured. These tests were performed at 20° C. utilizing a linear extension rate of 1 millimeter/minute. The results of the foregoing tests were reported in the following Table I. The blank was a composite assembly fabricated as above, but utilizing a plate of glassy carbon which had not been subjected to any surface treatment. The tests 1 to 7 relate to composites fabricated from the plates of glassy carbon treated according to the conditions of Examples 1 to 7, respectively.

TABLE I

| Tests: | Tensile strength kg./cm.$^2$ |
|---|---|
| Blank | 0 |
| 1 | 100 |
| 2 | 150 |
| 3 | 125 |
| 4 | 85 |
| 5 | 270 |
| 6 | 200 |
| 7 | 230 |

From the above Table I, it will be appreciated that the composite fabricated from the "blank" exhibited a tensile strength of zero under the test conditions, which result characterizes a total lack of adhesion between the reinforcement (plate of untreated glassy carbon) and the matrix (the resin component).

By way of further comparison, additional composite assemblies were fabricated from plates of glassy carbon treated chemically in liquid phase by application thereto of strong oxidizing agents. In Table II which follows there are reported the results of the above tensile strength measurements being performed upon the composites fabricated from the chemically treated plates. The said Table II also reflects the nature and duration of the chemical treatment, and in comparing the results reported in Table II with those reported in Table I, it is again apparent that according to the invention tensile strength is comparatively markedly enhanced.

TABLE II

| Treating agents for glassy carbon | Temperature of treatment (° C.) | Duration of treatment (hours) | Tensile strength [1] |
|---|---|---|---|
| Sulfochromic mixture | 80 | 10 | 40 |
| Chromyl chloride | 116 | 14 | 0 |
| Hot aqua regia | 80 | 2 | 0 |
| Concentrated $HNO^3$ | 86 | 10 | 0 |
| Diluted $HNO^3$ | 80 | 10 | 0 |

[1] Of the composite obtained with the glassy carbon thus treated.

It will also be appreciated that only that plate of glassy carbon which was treated with the mixture of sulfuric and chromic acids [3] exhibited any degree of adhesion to the maxrix component, but on the other hand this degree of adhesion was markedly inferior to that attained according to the invention.

EXAMPLE 8

A bundle of carbon fibers was connected to assume the position of cathode target in a conventional cathodic sputtering apparatus. Upon degassification under a vacuum of $10^{-6}$ torr, a stream of pure argon was slowly introduced into the vacuum chamber via a valved conduit until a pressure of $70 \cdot 10^{-3}$ torr was attained. A high continuous voltage of 3 kv. was then applied to the cathodic target for about 3 minutes with the result of superficial disintegration of the said carbon fiber bundle due to bombardment by positive ions.

EXAMPLE 9

In this example the procedures, conditions and parameters of Example 8 were duplicated, exactly as therein set forth, except that the atmosphere of pure argon was replaced with an atmosphere of pure oxygen.

EXAMPLE 10

In this example the procedures, conditions and parameters of Example 8 were again duplicated, exactly as therein set forth, except that the ionic bombardment was conducted for a period of about 6 minutes.

Tensile strengths were next determined for monofilaments treated according to the immediately above Examples 8, 9 and 10. For test purposes it was necessary to insure that the said filaments be free from any sort of mechanical contact which might interfere with the results of the respective measurements. To this end each filament was affixed by means of wax droplets to a perforated paper ribbon with the longitudinal axis thereof being parallel to the long axis of the ribbon. The sides of the perforated ribbon were lastly cut and each sample thus obtained was secured in a tensile strength measuring traction apparatus.

In the Table III which follows there are reported the tensile strengths of the respective monofilaments, the tests being conducted at 20° C. utilizing a linear extension rate of 1 millimeter/minute.

TABLE III

| Example | Tensile strength kg./mm.$^2$ |
|---|---|
| 8 | 150 |
| 9 | 165 |
| 10 | 123 |
| Untreated sample | 150 |
| Sample treated with nitric acid | 50 |

The test on the sample of Example 10 reflects that ionic bombardment of unduly lasting duration slightly weakened the tensile strength of that monofilament. Contrariwise, chemical treatment of a like monofilament with nitric acid leads to a marked decrease in mechanical resistance and tensile strength.

Composites formed from a resin matrix and reinforcing filaments treated according to the above Examples 8, 9 and 10 were next prepared employing an epoxy resin based upon triepoxide trimethylolpropane cured with diethylenetriamine. In the Table IV which follows there are reported the bending strengths of such composites, the measurements having been taken under the conditions of testing previously reported for the Examples 1 to 7.

TABLE IV

| Composites: | Bending strength in kg./mm.$^2$ |
|---|---|
| 8 | 40 |
| 9 | 52 |
| 10 | 41 |
| Blank | 32 |

Composites 8, 9 and 10 were prepared from carbon fibers subjected to the treatments of Examples 8, 9 and 10, respectively. The blank composite was fabricated from untreated carbon fiber.

While there have been described and pointed out the fundamental novel features of the invention as applied to the preferred embodiment, those skilled in the art will appreciate that various modifications, changes and omissions in the cathode sputtering of carbon substrate illustrated and described can be made without departing from the spirit of the invention. It is the intention, therefore, to be limited only by the scope of the following claims.

What is claimed is:

1. A method for the manufacture of a composite reinforced assembly comprising at least one conductive carbon reinforcing element contiguous with and firmly bonded to a continuous phase of a binder material, which method comprises (a) preparing the surfaces of said conductive carbon reinforcing element by a process comprising providing an anode within an evacuated chamber, providing said conductive carbon substrate as a cathode within said chamber, introducing a discharge gas into said chamber, and producing a voltage differential between said anode and said conductive carbon cathode of such magnitude to cause said discharge gas in the vicinity of said anode to ionize and to cause said ionized gas molecules to impinge upon the conductive carbon cathode with sufficient bombarding force to cause superficial cathode sputtering of said conductive carbon cathode; (b) bringing the treated reinforcing element into contact with a binder material; and (c) forming said binder material and reinforcing element into the desired configuration.

2. The method as defined by claim 1, wherein the reinforcing element is of generally planar configuration and said binder material is coated or laminated thereonto.

3. The method as defined by claim 1, wherein said composite assembly is formed by encapsulating a plurality of reinforcing elements in a continuous matrix of said binder material.

4. The method as defined by claim 3, wherein said reinforcing elements are filamentous elements.

---
[3] This mixture is a 60%/40% mixture of sulfuric and chromic acids.

5. The method as defined by claim 1, wherein said binder material is a heat-curable synthetic resin.

6. A composite reinforced assembly comprising at least one conductive carbon reinforcing element contiguous with and firmly bonded to a continuous phase of a binder material, said assembly being produced in accordance with the method defined by claim 1.

References Cited

UNITED STATES PATENTS

| | | | |
|---|---|---|---|
| 3,325,393 | 6/1967 | Darrow et al. | 204—192 |
| 3,573,086 | 3/1971 | Lambdin | 161—182 |
| 3,695,916 | 10/1972 | Pike | 117—47 R |
| 3,637,424 | 1/1972 | Miller | 117—47 R |
| 3,626,042 | 12/1971 | Appleby | 264—29 |
| 3,301,742 | 1/1967 | Noland et al. | 161—170 |
| 3,720,536 | 3/1973 | Scola et al. | 117—47 R |

DANIEL J. FRITSCH, Primary Examiner

U.S. Cl. X.R.

117—47 R; 156—62.2, 153, 180, 296; 161—182, 184; 204—192